United States Patent [19]

Elvin

[11] Patent Number: 4,657,269
[45] Date of Patent: Apr. 14, 1987

[54] TANDEM INFANT CARRIER

[76] Inventor: Pamela Elvin, 1828 Greenplace Terr., Rockville, Md. 20850

[21] Appl. No.: 811,232

[22] Filed: Dec. 20, 1985

[51] Int. Cl.<sup>4</sup> .............................................. B62B 9/12
[52] U.S. Cl. ................................... 280/47.38; 297/232
[58] Field of Search ................. 280/33.99 B, 642, 643, 280/647, 648, 650, 87.02 W, 47.18, 47.19, 47.25, 47.35, 47.38; 297/232, 234, 236, 243

[56] References Cited

U.S. PATENT DOCUMENTS

| | | | |
|---|---|---|---|
| 2,789,733 | 4/1957 | Secord, Jr. | 222/185 |
| 2,857,953 | 10/1958 | Berger et al. | 280/47.35 |
| 2,957,700 | 11/1960 | Beaurline | 280/47.19 |
| 2,993,702 | 7/1961 | Gill | 280/643 |
| 3,235,279 | 2/1966 | Smith et al. | 280/648 |
| 3,309,101 | 3/1967 | Romay | 280/47.38 |

FOREIGN PATENT DOCUMENTS 519333  11/1950  Canada ................................. 280/650

Primary Examiner—John J. Love
Assistant Examiner—Richard Camby
Attorney, Agent, or Firm—Henderson & Sturm

[57] ABSTRACT

A tandem infant carrier apparatus (10) comprising the combination of a wheeled stroller unit (11) an infant carrier unit (13) and an articulated framework unit (16) operatively connected to the wheeled stroller unit (11) and the infant carrier unit (13); wherein, the articulated framework unit (16) is provided with a brake element (32) that may be deployed into ground engaging contact by manipulation of the articulated framework unit (16).

5 Claims, 7 Drawing Figures

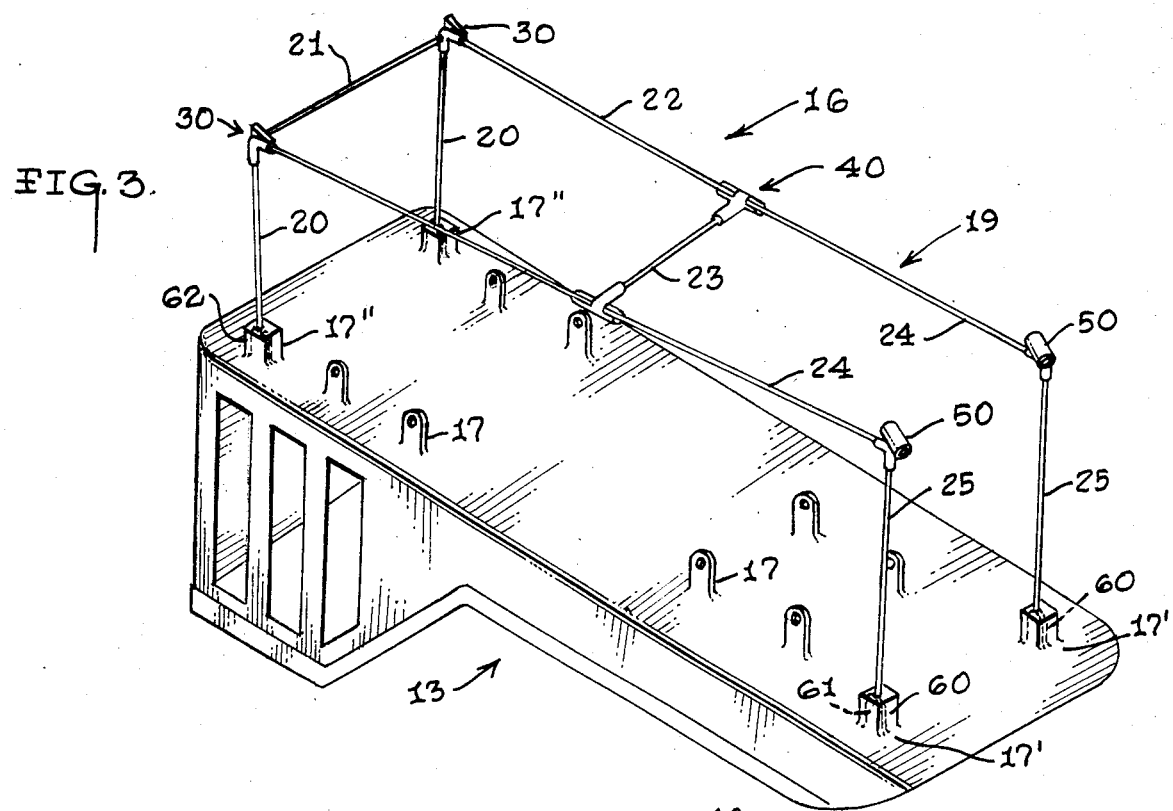
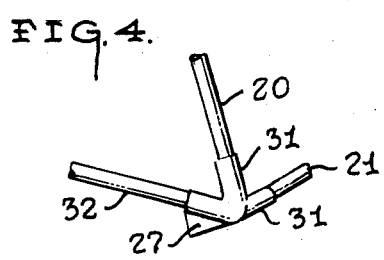
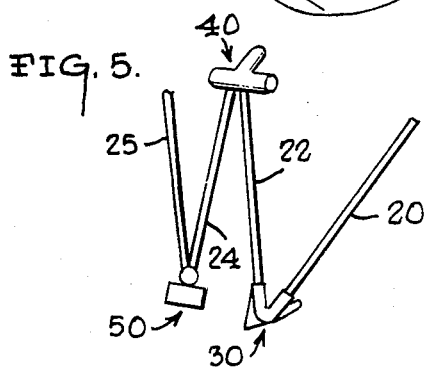
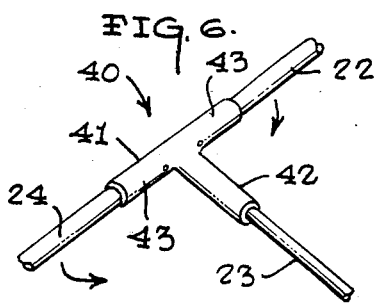
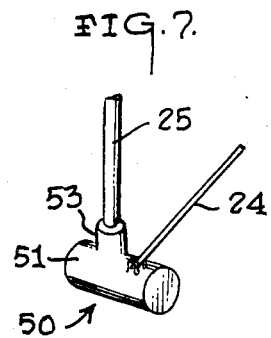

TANDEM INFANT CARRIER

TECHNICAL FIELD

The present invention relates generally to apparatus used to transport or carry infants and young children.

BACKGROUND OF THE INVENTION

The prior art is replete with tandem stroller constructions and the like used to transport more than one child as can be seen by reference to U.S. Pat. Nos.: 3,235,279; 2,993,702; 2,857,953; and 2,789,733.

While all of the aforementioned tandem infant strollers are more than adequate for their intended purpose and function they have limited utility, except for parents of twins.

As a practical matter, while most young couples do not have twins, they usually have children close enough in age as to be the equivalent of twins particularly from a care, feeding, and logistical standpoint.

In as much as it is virtually impossible to either guarantee or accurately predict the time intervals between pregnancies, the prior art tandem strollers have found limited acceptance by the purchasing public, even though hindsight causes many parents to wish they had the foresight to purchase such a device.

Unfortunately, when the need for a tandem stroller arrives, it usually occurs after the parents have already purchased a single infant stroller, and the economics of the situation cannot justify the expense for the time interval of actual usage envisioned.

Given this all too common situation a solution to this problem was sought; wherein an existing single stroller construction could be modified or adapted to accommodate more than one child. The end result of this search produced the subject matter of this invention, wherein two distinct commercially available infant carriers were combined in a new, unique, and novel manner; and, one of the carriers was modified so as to enhance this novel cooperation of elements, so that they functioned as a single unit.

SUMMARY OF THE INVENTION

The present invention involves combining two existing and acknowledged prior art constructions in a new and unique manner to produce a tandem infant carrier; wherein, each of the prior art constructions were originally designed as distinct and disparate, individual, child or infant transporting devices; and, further modifying one of the acknowledged prior art constructions to not only improve its interaction in combination with the other prior art construction, but also to increase its own utility when used apart from the other prior art construction.

Briefly stated the instant invention involves combining a wheeled stroller and an infant carrier, such that the infant carrier is disposed rearwardly of the wheeled stroller, and supported and suspended from the handles of the stroller, to produce the basic tandem stroller configuration. In addition the infant carrier is further modified by the provision of an articulated framework member on its underside; wherein the outboard end of the framework member is provided with friction elements that serve as brake elements for the combined structures.

The aforementioned prior art components that comprise the basic combination include: a wheeled stroller manufactured in Italy by the Perego Co.; and, a double handled infant carrier manufactured in Australia by the Frazer Co.

While this basic combination represents an advancement in the tandem stroller art on its own merits, the further modification embodied by the articulated framework member not only vastly improves the utility of the infant carrier alone, but also enhances the cooperation between the individual components in their combined mode.

BRIEF DESCRIPTION OF THE DRAWINGS

These and other objects, advantages, and novel features of the invention will become apparent from the detailed description of the best mode for carrying out the preferred embodiment which follows, particularly when considered in conjunction with the accompanying drawings wherein:

FIG. 3 is a bottom perspective view of the child carrier with the framework member deployed;

FIG. 4 is an enlarged detail view of the brake element on the framework member;

FIG. 5 is an isolated view of the framework member in its detached and collapsed mode;

FIG. 6 is an enlarged detail view of the central pivot element on the framework member; and, FIG. 7 is an enlarged detail view of the stroller engaging clamp on the framework member.

BEST MODE FOR CARRYING OUT THE INVENTION

Figure 1:
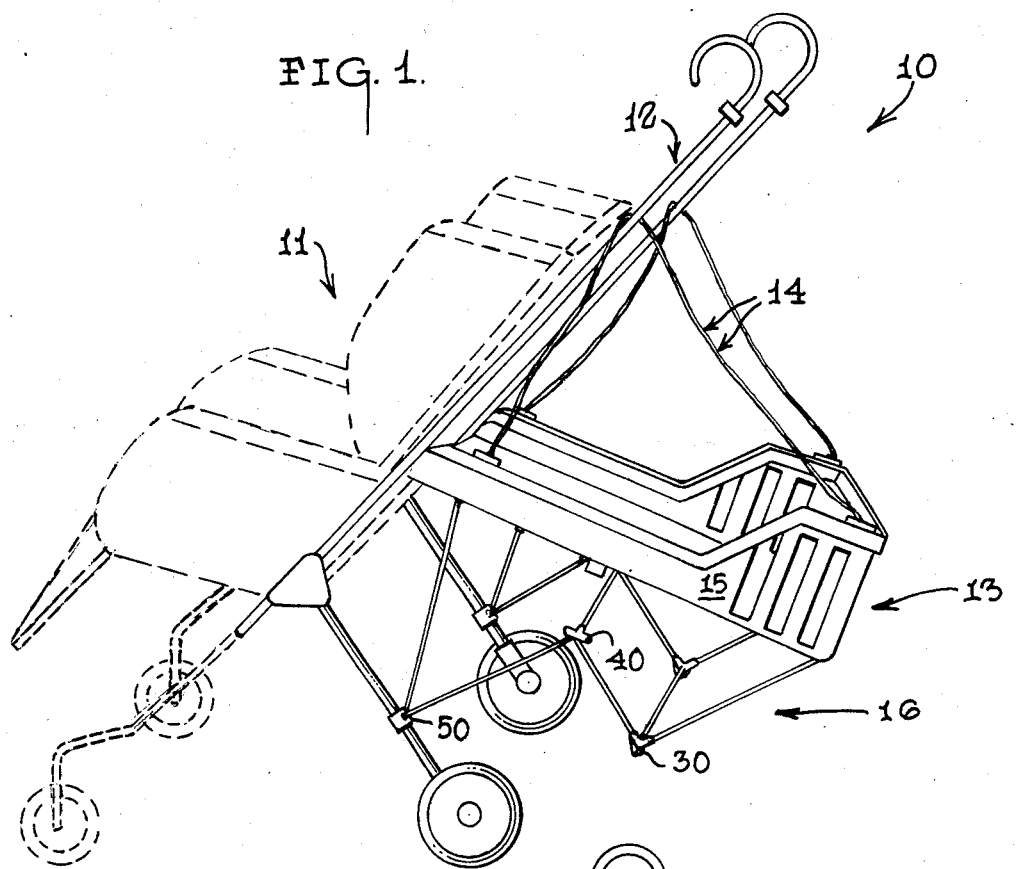
FIG. 1 is a perspective view of the combination of components that comprise the basic invention.

The basic combination that comprises the present invention is depicted in FIG. 1 and designated generally by the reference numeral (10). This combination (10) includes: a wheeled stroller unit (11) having a pair of rearwardly extending rigid handles (12); and, an infant carrier (13) having a pair of flexible elongated strap handles (14) extending along the elongated sides (15) of the carrier unit (13).

As mentioned earlier in the specification, both the wheeled stroller unit (11) and the infant carrier unit (13) are acknowledged prior art; however, the discovery that these units can be combined by looping the flexible handles (14) of the carrier unit (13) over the rigid handles (12) of the stroller unit (11) to produce a tandem infant carrier (10) is considered to have patentable significance.

This is particularly significant due to the fact that, both of the basic units (11) and (13) are normally purchased when the first child arrives; yet the individual units are normally used as different modes of transporting the first child. The basic invention therefore represents an unobvious utilization of normally previously purchased components to produce a unique tandem stroller combination (10).

While the basic combination (10) is considered to be an advancement over the previously patented tandem stroller configurations mentioned above, the articulated framework unit (16) about to be described represents a quantum leap in this particular field. As can best be seen in FIG. 3 the particular infant carrier unit (13), for which the articulated framework unit (16) was developed, is provided with a plurality of apertured projections (17) which are disposed in parallel, opposed, staggered pairs on the underside (18) of the infant carrier unit (13).

These apertured projections (17) were originally designed to accommodate one or more stationary support elements (not shown) to elevate either or both ends of the carrier unit (13). However, as will be explained shortly, these projections not only lend themselves to the installation of the articulated framework unit (16); but, it almost seems as if the specific infant carrier (13) in question was specifically designed with the articulated framework unit (16) in mind.

As can best be seen by reference to FIG. 3, the articulated framework unit (16) comprises a framework member (19) that may be operatively connected to both the infant carrier unit (13) and the wheeled stroller unit (11) as will be explained presently.

As viewed from left to right in FIG. 3 the framework member (19) comprises in general: a pair of outboard framework segments (20); an outboard cross-piece framework segment (21); a pair of outboard intermediate framework segments (22); an intermediate cross-piece framework segment (23); a pair of inboard intermediate framework segments (24); and, a pair of inboard framework segments (25).

In addition, the framework member (19) further comprises: brake members (30); intermediate framework connector members (40); clamp members (50); and, inboard and outboard connector members (60), which operatively connect the framework member (19) together to the infant to the infant carrier unit (13) and the wheeled stroller unit (11).

As best seen in FIGS. 3 and 4, each of the brake members (30) are provided with a plurality of hollow tubular legs (31), which are dimensioned to fixedly receive the outboard framework segments (20), the outboard cross-piece framework segment (21); and the outboard intermediate framework segments (22). In addition, each of the brake members (30) is further provided with a generally triangular brake element (32) which projects a substantial distance above the tubular leg (31) that receives the respective outboard intermediate framework segments (22).

As can best be seen by reference to FIG. 6, each of the intermediate framework connector members (40) comprise a generally T-shaped body element (41) wherein the central leg (42) of the body element is fixedly secured to the intermediate cross-piece framework segment (23); and, the arms (43) of the body element are secured to the inboard and outboard intermediate framework segments (22) and (24), and disposed for restricted relative movement with respect to the central leg (42) of the body element (41).

Turning now to FIG. 7, it can be seen that each of the clamp members (50) comprise a generally cylindrical clamp element (51) provided with a stationary tubular leg element (53). The cylindrical clamp element (51) is designed to releasably engage a portion of the wheeled stroller unit (11), while maintaining the inboard framework segment (25) in a fixed relationship with respect thereto; and, which also permitting the inboard intermediate framework segment to be pivoted with respect thereto.

The previously described structural cooperation between the components of the framework members (19), allows the two intermediate framework segments (22) and (24) to be pivoted together to effect a partial collapse of the framework member as depicted in FIG. 5, for storage purposes.

The inboard and outboard connector members (60) comprise apertured housing element (61) dimensioned to slidingly engage the inboard (17') and outboard (17") raised apertured projections on the child carrier unit (13). In addition, the housing elements (61) are further provided with pivot means (62) that extend through the housing elements (61) and the raised projections (17) to effect the operative connection between the carrier unit (13) and the articulated framework unit (16).

Figure 2:
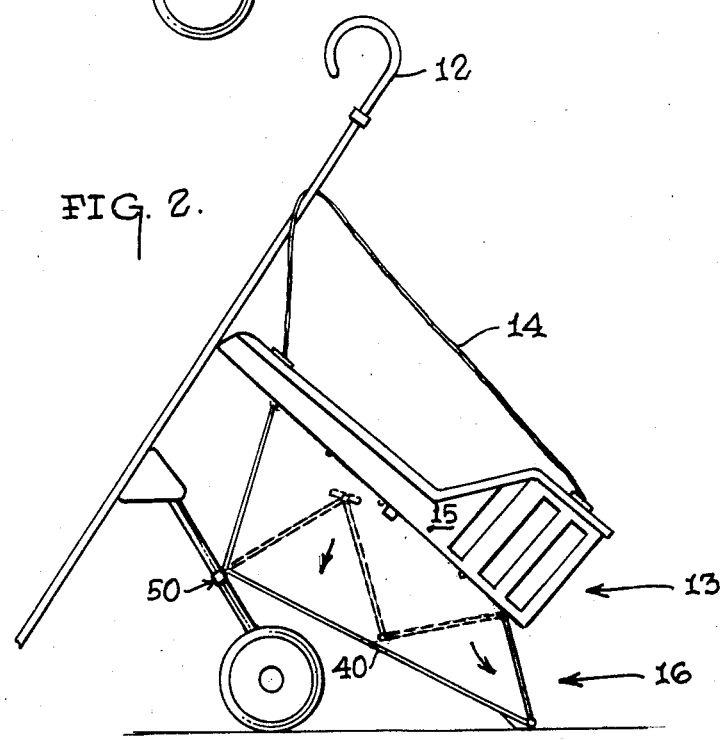
FIG. 2 is a side elevation of the combination showing the articulated framework member in its retracted and deployed mode.

The cooperation between the wheeled stroller unit (11), the infant carrier unit (13) and the articulated framework unit (16) can best be seen by reference to FIGS. 1 and 2. Once the articulated framework unit (16) has been operatively connected to the infant carrier unit (13), the flexible handles (14) of the carrier unit (13) are looped over the rigid handles (12) of the stroller unit (11). The clamp members (50) on the framework unit (16) are then engaged with a rigid portion of the wheeled stroller unit (11) to complete the basic assembly of the combined apparatus (10).

Once the combined apparatus (10) has been assembled, the user has a choice of disposing the articulated framework unit (16) in either the retracted or deployed mode relative to the stroller unit (11) and carrier unit (13). In the retracted mode depicted in FIG. 1, the outboard and inboard intermediate framework segments (22) and (24) have been pivoted towards one another, to swing the brake member (30) inwardly and upwardly relative to the infant carrier unit (13).

The aforementioned deployment collapses the framework unit (16) under the infant carrier unit (13), to prevent the person who is pushing the combined apparatus (10) from tripping or stepping on any portion of the articulated framework unit (16).

In the deployed mode depicted in FIG. 2, the user has pivoted the inboard and outboard intermediate framework segments (22) and (24) away from one another, such as by stepping downwardly on the inboard intermediate framework segment (24). This action causes the brake member (30) to move downwardly with respect to the carrier unit (13) and to engage the brake element (32) with the terrain (100) upon which the stroller unit (11) rests.

It should further be appreciated at this juncture that the intermediate framework connector members (40) are dimensioned and designed so as to allow the intermediate framework segments (22) and (24) to assume an over-center relationship with respect to the connector member (40) in the deployed mode. The aforementioned cooperation between the intermediate framework segments (22) and (24) and the intermediate framework connector members (40) is necessary: to produce a positive engagement of the high friction coefficient brake element (32) with the surrounding terrain (100); as well as, to prevent the articulated framework unit (16) from accidentally being dislodged from the deployed mode into the retracted mode.

In an alternate embodiment (not shown) it is contemplated that the pivoted connections on the articulated framework unit (16) will be provided with suitable releasable locking means, whereby the moveable framework segments may be temporarily immobilized in a variety of positions relative to one another to produce a variety of angular stand configurations for the infant carrier unit (13) when used in a stand-alone mode in conjunction with the articulated framework unit (16).

Having thereby described the subject matter of this invention, it should be obvious that many substitutions, modifications and variations of the invention are possible in light of the above teachings. It is therefore to be understood that the invention as taught and described herein is only to be limited to the extent of the breadth and scope of the appended claims.

I claim:

1. A tandem infant carrier apparatus comprising the combination of:

a wheeled stroller unit having a pair of rearwardly extending rigid handles;

an infant carrier unit having a pair of elongated flexible handles, wherein the flexible handles are looped over the said rigid handles on the wheeled stroller unit to dispose and support the infant carrier unit rearwardly of said wheeled stroller unit; and, an articulated framework unit operatively connected to the bottom of the infant carrier unit and a portion of the wheeled stroller unit and further provided with a ground engaging brake element; wherein, the framework unit comprises a plurality of framework segments connected to one another by brake members, intermediate framework connector members, and clamp members, wherein the clamp members also connect the framework unit to the wheeled stroller unit, and the framework unit further comprises inboard and outboard connector members disposed on opposite ends of the framework unit which operatively connect the framework unit to the bottom of the infant carrier unit; wherein, both the outboard connector member and the intermediate connector members comprise pivoted connections that permit the framework unit to be selectively disposed in a retracted mode and a deployed mode.

2. The combination of claim 1; wherein, the articulated framework unit may be disposed in a retracted mode relative to the infant carrier unit and the wheeled stroller unit, by pivoting the brake element upwardly and inwardly relative to the outboard connector and out of engagement with the ground.

3. The combination of claim 1; wherein, the articulated framework unit may be disposed in a deployed mode relative to the infant carrier unit and the wheeled stroller unit, by pivoting the brake element downwardly and outwardly relative to the outboard connector and into engagement with the ground.

4. A tandem infant carrier apparatus comprising the combination of:

a wheeled stroller unit having a pair of rearwardly extending rigid handles;

an infant carrier unit having a pair of elongated flexible handles, wherein the flexible handles are looped over the said rigid handles on the wheeled stroller unit, to dispose and support the infant carrier unit rearwardly of said wheeled stroller unit; and, an articulated framework unit operatively connected to the bottom of the infant carrier unit and a portion of the wheeled stroller unit wherein the articulated framework unit comprises:

a pair of outboard framework segments secured on one end to said carrier unit by outboard connector members, and having a brake member provided on their other end;

a pair of inboard framework segments pivotally secured on one end to said carrier unit by inboard connector members, and having a clamp member provided on their other end;

a pair of outboard intermediate framework segments and a pair of inboard intermediate framework segments pivotally connected to one another; wherein, said outboard intermediate framework segments are connected to said outboard framework segments by said brake members; and, wherein said inboard intermediate framework segments are connected to said inboard framework segments by said clamp members; wherein said clamp members operatively connect said articulated framework unit to said wheeled stroller unit.

5. A tandem infant carrier apparatus comprising the combination of:

a wheeled stroller unit having a pair of rearwardly extending rigid handles;

an infant carrier unit having a pair of elongated flexible handles; wherein the flexible handles are looped over the said rigid handles on the wheeled stroller unit to dispose and support the infant carrier unit rearwardly of said wheeled stroller unit; and, an articulated framework unit operatively connected to the bottom of the infant carrier unit and a portion of the wheeled stroller unit; wherein, the articulated framework unit comprises a framework member having inboard framework segments and outboard framework segments pivotally connected; wherein, the inboard framework segments are provided with clamp members that operatively connect said framework unit to said wheel stroller unit; and, wherein the outboard framework segments are pivotally secured to said infant carrier unit and provided with brake members that may be selectively engaged with the ground.

* * * * *